June 18, 1968  M. HILSENRATH ETAL  3,389,336
TIME DELAY TESTER HAVING FEEDBACK INDUCED OSCILLATION
Filed May 8, 1964  2 Sheets-Sheet 1

INVENTORS
MANFRED HILSENRATH
JOHN V. MEEHAN
MICHAEL J. PATTI
JOSEPH SQUARZINI, JR.

BY David N. Koffsky
ATTORNEY

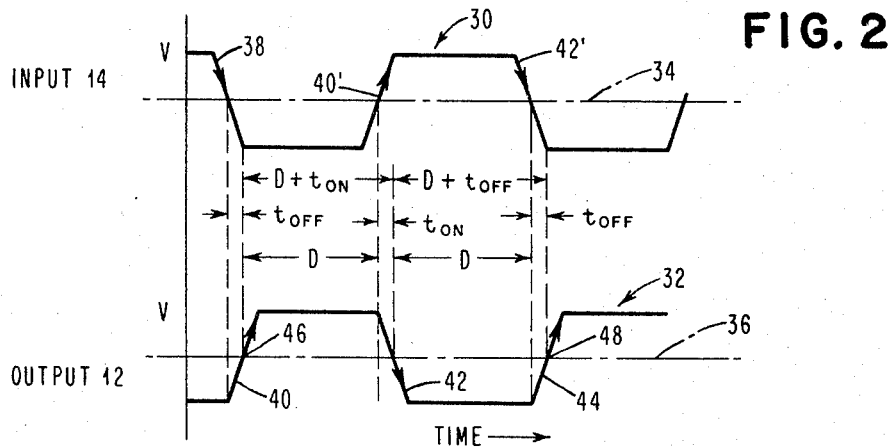
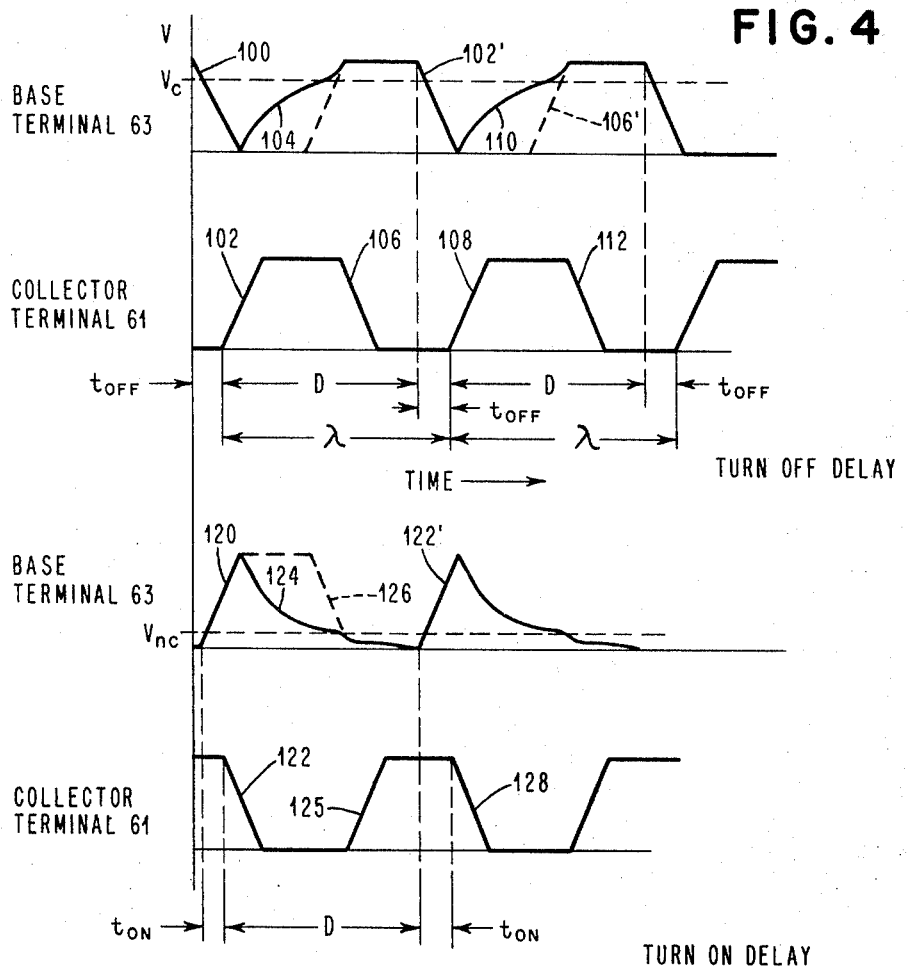

United States Patent Office 3,389,336
Patented June 18, 1968

3,389,336
TIME DELAY TESTER HAVING FEEDBACK
INDUCED OSCILLATION
Manfred Hilsenrath, Los Gatos, Calif., and John V. Meehan, Poughkeepsie, Michael J. Patti, Hyde Park, and Joseph Squarzini, Jr., Hopewell Junction, N.Y., assignors to International Business Machines Corporation, New York, N.Y., a corporation of New York
Filed May 8, 1964, Ser. No. 366,101
1 Claim. (Cl. 324—158)

ABSTRACT OF THE DISCLOSURE

A time delay tester for determining turn on and turn off delay of a unit under test. The time delay tester is comprised of a passive feedback means containing a delaying means and an inverting means between the output and input of the unit under test, a biasing means to allow the unit to oscillate and a recording means.

This invention relates to test circuits and more particularly to a test system for determining the electrical time delay properties of a device such as a transistor.

To measure time delay characteristics of logic circuits or devices, the most commonly used method is to apply a waveform of known shape and duration to the unit under test and measure the output response of the device. While this technique is satisfactory for slow speed circuits and devices, its application to present state of the art logic circuits and devices (e.g., having propagation speeds of 1 nanosecond or better) is both expensive, inaccurate and slow. Normally, it is considered ideal to apply to the unit under test a pulse which is a facsimile of that which it will see in actual practice. Practically, such signals are extremely difficult to define in a mathematical sense and thus cannot be readily generated. For this reason, in testing for transistor rise and fall time parameters or the amount of degradation which occurs to these parameters in a logic circuit, a test pulse is applied to the unit under test which only approximates the actual pulse. This requires a signal generator capable of generating a variable duration, rectangular pulse having a rise time of less than 5 nanoseconds. While such generators are available, they are expensive and difficult to calibrate and maintain. Other types of input signals have been attempted, e.g., ramps and exponentials, but these also are difficult to generate (in the case of the ramp, considerable effort must be spent to obtain linearity) and difficult to calibrate (e.g., the exponential).

Another major problem in the use of the standard pulse generator techniques is that few generators exhibit required long term stability, e.g., for one reason or another the test pulse often varies in rise or fall times. This simple variation, which may be caused by any of a number of factors—the aging of a capacitor, leakage of a transistor—may cause the generation of erroneous test readings resulting in the needless discord of great numbers of devices.

In addition to the above-mentioned problems, present techniques for measuring the rise and fall time delays of devices under test are inadequate to provide the needed resolution in the low or fractional nanosecond response region. While the oscilloscope is a reasonably accurate test device, it is unsuited to large scale automated production application.

Accordingly, it is an object of this invention to provide an improved method for testing the time delay of a unit under test.

It is a further object of this invention to provide an improved apparatus for testing the time delay of a unit under test which is of simple construction.

It is still another object of this invention to provide a test system for testing turn-on and turn-off delay times of units under test wherein there is no requirement for external signal generation equipment.

It is still a further object of this invention to provide an apparatus for determining the turn-on and turn-off delays of a unit under test which requires little calibration.

Yet another object of this invention is to provide a test system for determining the time delay of a unit under test which can be applied to large scale production activities.

In accordance with the above-stated objects, a delay-feedback network is provided which oscillates in a non-sinusoidal manner when a unit under test has its output fed back through the delay unit to its input. By comparing the frequency of oscillations resulting from the unit under test and the frequency of oscillations resulting from a standard unit, the delay time acceptability of the unit under test can be determined.

In a further embodiment of the invention, a feedback signal causes the unit under test to translate from a steady state output a temporary output state, and produce an inverted output transient which is delayed, fed back and inverted in a feedback network. During the interval when the output transient is in the feedback network, the unit under test is caused to revert to its steady state so that the arrival of the inverted output transient at the input causes the unit under test to again trigger to its temporary output state. In his manner, the turnoff waveform of a unit under test causes the unit to turn off again, etc., with a similar occurrence happening for a turn-on waveform.

The foregoing and other objects, features and advantages of the invention will be apparent from the following more particular description of preferred embodiments of the invention, as illustrated in the accompanying drawings.

In the drawings:

FIG. 2 is a waveform diagram helpful in the description of the embodiment of the invention of FIG. 1.

FIG. 4 is a diagram of waveforms helpful in the description of the operation of the circuit of FIG. 3.

Figure 1:
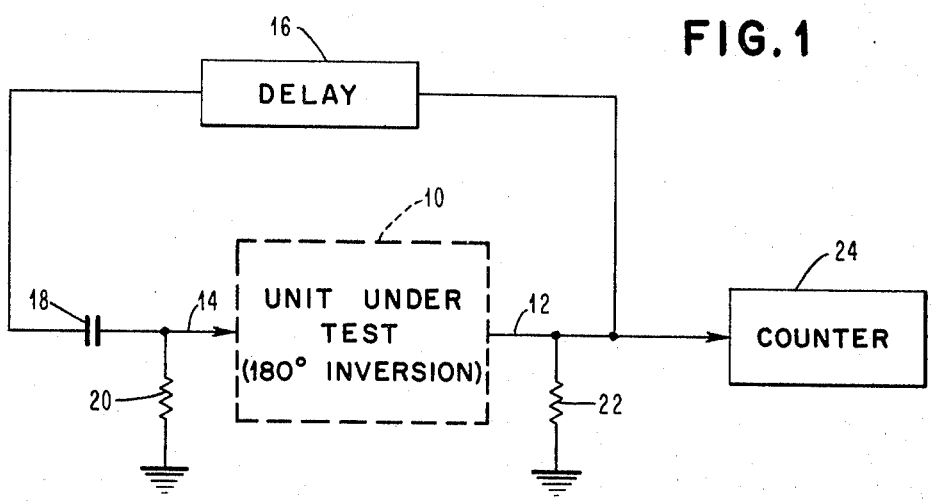
FIG. 1 is a circuit diagram of an embodiment of the invention.

Referring now to FIG. 1, unit under test 10 may be any electronic device which provides a 180° phase inversion between its input and output, e.g., a transistor, a vacuum tube, a logic circuit, etc. For the purposes of the remaining discussion, it will be assumed that unit under test 10 is a transistor with its collector being connected to output conductor 12 and its base circuit being connected to input conductor 14. A positive feedback network including delay line 16 and capacitor 18 connects output conductor 12 with the input conductor 14. Resistors 20 and 22 connect conductors 14 and 12 respectively to a common potential and serve as terminating impedances for delay line 16. Output conductor 12 is also connected to counter 24 whose function will hereinafter be described.

The circuit shown in FIG. 1 will oscillate provided that unit under test 10 has a gain of greater than 1, produces a 180° phase inversion and the delay of delay line 16 is longer than the delay of unit under test 10. That this phenomenon can be readily utilized to measure the delay time characteristics of unit under test 10 will become more readily apparent when reference is made to FIG. 2. The waveforms shown in FIG. 2 are considerably simplified from those which are ordinarily experienced but provide for an easier understanding of the operation of the circuits. As is well known, all transistors, for instance, have inherent time delays in their operation. If a transistor voltage is applied to the base circuit of a transistor, the collector responds not immediately, but a discrete time interval later than the time at which the base signal was applied. If the transistor is caused to become nonconductive after previously being conductive, this time interval is called the turn-off delay; whereas, if a previously non-conductive transistor is rendered conductive, the delay between the application of the base voltage and the resulting change in collector voltage is called the turn-on delay.

Waveform 30 is the oscillatory signal as it appears on input conductor 14 and waveform 32 is the resulting output signal on conductor 12 in response to input signal 30. In the following rescription, all time measurements will be taken from waveform center lines 34 and 36 respectively.

If it is assumed that negative-going waveform 38 is applied to input conductor 14, unit under test 10 responds by inverting this signal 180° and causing it to become positive-going waveform 40. As can be seen, waveform 40 does not appear at output terminal 12 immediately upon the occurrence of waveform 38, but is delayed a small period of time by the inherent delay in unit under test 10. Assuming that the unit under test is an NPN transistor, this period of time will be termed the turn-off ($t_{off}$) delay. Once positive-going waveform 40 appears on conductor 12, it is inserted into delay line 16 and after a time delay D appears at input conductor 14 (waveform 40'). Waveform 40' is inverted by unit under test 10 and appears as negative-going waveform 42 on output conductor 12 after the turn-on delay interval. Waveform 42 is now inserted into delay line 16 and arrives at input conductor 14 as negative-going wave 42'. This input causes unit under test 10 to turn off after a discrete delay interval and produce output waveform 44.

A complete cycle for the circuit of FIG. 1 can be measured from intersection point 46 between center line 36 and positive-going waveform 40, to intersection point 48 between center line 36 and positive-going waveform 44 with the time interval therebetween being expressed as:

$$D + t_{on} + D + t_{off} \quad (1)$$

or $$2D + t_{on} + t_{off} \quad (2)$$

As is well known, frequency can be expressed in terms of wavelength as follows:

$$f = \frac{1}{\lambda} \quad (3)$$

where $\lambda = 1$ wavelength expressed in units of time. In this case $$\lambda = 2D + t_{on} + t_{off} \quad (4)$$

From the foregoing, the frequency of oscillation of the circuit of FIG. 1 is seen to be directly dependent upon the sum total of the delay time of delay line 16 and the turn-on and turn-off delays of the unit under test. By monitoring the frequency of oscillation of the circuit in counter 24, an extremely accurate indication of the delay time of the unit under test can be achieved. That this is so will be obvious from the following derivation and example.

Assume that a unit having satisfactory delay times is used as a standard and causes the circuit of FIG. 1 to oscillate at a frequency $$f_1 = \frac{1}{\lambda} \quad (5)$$

Assume further that an unknown unit having a somewhat different delay time $\lambda + \Delta\lambda$ causes the circuit to oscillate at a frequency $$f_1 = \frac{1}{\lambda + \Delta\lambda} \quad (6)$$

the difference between these two frequencies will be $$f_1 - f_2 = \frac{1}{\lambda} - \frac{1}{\lambda + \Delta\lambda} = \frac{\Delta\lambda}{\lambda(\lambda + \Delta\lambda)} \quad (7)$$

Since $\lambda(\Delta\lambda)$ is small with respect to $\lambda^2$ it may be disregarded and the equation written $$f_1 - f_2 = \frac{\Delta\lambda}{\lambda^2} \quad (8)$$

Equation 8 must be exemplified to be appreciated. With a typical 100 nanosecond ($10^{-9}$) loop delay, assume that the wavelength difference between the standard and test units is .1 picosecond ($10^{-12}$ secs.). The frequency difference as measured by counter 24 will be $$f_1 - f_2 = \frac{\Delta\lambda}{\lambda^2} = \frac{10^{-12}}{(100 \times 10^{-9})^2} = \frac{10^{-12}}{10^{-14}} = 100 \text{ cycles}$$

Since most counters are typically accurate to within ±2 cycles, a ±.1 picosecond difference in delay time, as represented by ±100 cycles, is easily detctable using the method of this invention.

Figure 3:
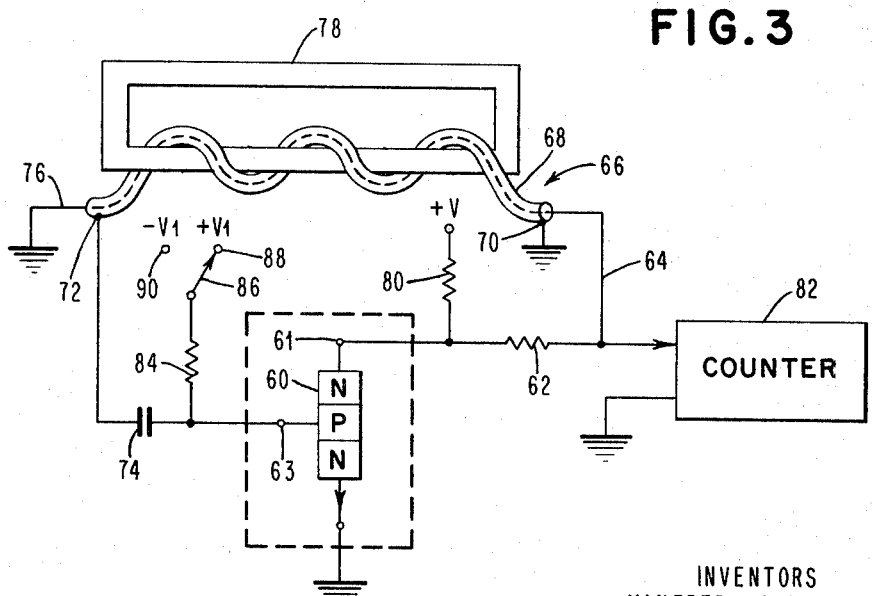
FIG. 3 is a circuit diagram of a further embodiment of the invention.

Referring now to FIG. 3, an alternative version of the circuit of FIG. 1 is shown which enables more accurate measurements of the turn-on and turn-off delays. Turn-on and turn-off waveforms, as they actually appear in the circuit of FIG. 1, are not symmetrical. This phenomenon is primarily due to non-linearities in the unit under test. Therefore, when, as above described, the fed back turn-off waveform in the circuit of FIG. 1 causes the unit under test 10 to generate a turn-on output, the shape and rise time of the output waveform is somewhat distorted since it is the product of the transfer characteristic of the unit under test *and* the fed back turn-off waveform. In the circuit of FIG. 3, this distortion does not occur.

Transistor 60, the unit under test, has its collector terminal 61 connected through resistor 62 to interior conductor 64 of coaxial cable 66. Shield 68 of coaxial cable 66 is grounded at point 70 and is connected at point 72 to one terminal of capacitor 74. The other terminal of capacitor 74 is connected to the base terminal 63 of transistor 60. Inner conductor 64 of coaxial cable 66 is grounded at point 76. Coaxial cable 66 has an electrical length D and acts as both a delay line and an inverter (in a manner to be described hereinafter). The entire cable is wrapped around ferromagnetic core 78 thereby creating a bifilar transformer. Collector terminal 61 is also connected, through resistor 80, to a source of negative biasing potential. Resistor 80 additionally acts as a terminating impedance for coaxial cable 66. Counter 82 is connected to resistor 62 and monitors the frequency of oscillation of the circuit. Base terminal 63 is connected through resistor 84 to switch 86.

If it is desired to test for the turn-off delay of transistor 60, switch 86 is positioned to contact 88 causing the connection of positive potential $+V_1$ to base terminal 63. If, on the other hand, it is desired to test for the turn-on delay of transistor 60, switch 86 is positioned to contact 90 causing negative potential $-V_1$ to be applied to base terminal 63.

The waveforms shown in FIG. 4 will now be used to explain the operation of the circuit of FIG. 3. To determine the turn-off delay of transistor 60, switch 86 must be positioned to contact 88. Voltage $+V_1$ charges capacitor 74 positively thereby rendering transistor 60 normally conductive. Assume that negative-going potential 100 (FIG. 4) emanates from terminal 72 of coaxial cable 66 and causes capacitor 74 to rapidly discharge, thereby rendering transistor 60 nonconductive. The output at collector 61, in response to input waveform 100, is positive-going turn-off waveform 102, delayed a fraction of time determined by the turn-off ($t_{off}$ delay of transistor 60. Turn-off waveform 102 passes through resistor 62 and is then inserted into center conductor 64 of coaxial cable 66 and appears at terminal 72 a time D afterwards. It should be here noted, that while the feedback waveform is inserted into coaxial cable 66 between conductor 64 and grounded terminal 70 of shield 68, it is sensed at the opposite end with terminal 72 of shield 68 being the positive terminal. A waveform inversion takes place by virtue of the transformer action between inner conductor 64 and shield 68—in the nature of a bifilar transformer with inner conductor 64 being the primary winding and shield 68 the secondary. It can thus be seen that the waveform which appears at terminal 72 (102′) is an exact inversion (delayed by a time D) of the turn-off waveform which was inserted into delay line 66 (102) via conductor 64.

During the time that turn-off waveform 102 traverses coaxial cable 66, other matters are occurring. As aforestated, the appearance of waveform 100 causes capacitor 74 to discharge. As soon as waveform 100 has passed, however, capacitor 74 commences to charge through resistor 84 from positive potential $+V_1$ connected at terminal 88 (as indicated by waveform 104). The time constant of resistor 84 in combination with capacitor 74 must be chosen so that the charge on capacitor 74 reaches the conduction threshold voltage for transistor 60 ($V_c$) in a time less than the time delay D of coaxial cable 66. When the charge on capacitor 74 reaches voltage $V_c$, transistor 60 is rendered conductive and the potential at collector terminal 62 falls as indicated by waveform 106. The slight step in waveform 104 which occurs as transistor 60 becomes conductive is caused by the arrival of a waveform corresponding to waveform 106 from the previous cycle of operation. This will be described in greater detail hereinafter.

The appearance of waveform 102′ at capacitor 74 produces the same result as waveform 100 produced, that is, it renders transistor 60 nonconductive with a resultant rise in the potential at collector 61 after the turn-off delay (waveform 108). Immediately thereafter, capacitor 74 having been discharged by waveform 102′ begins to charge in a manner similar to that shown at waveform 110. As soon as the potential at base terminal 63 reaches $V_c$, transistor 60 is rendered conductive and produces negative-going potential 112 at collector terminal 61. Delayed waveform 106′ arrives at the base terminal 63 of transistor 60 but has no effect thereon due to the fact that transistor 60 is already conductive by virtue of the charge on capacitor 74.

Counter 82 monitors the output from collector terminal 62 and registers a count indicative of the frequency of oscillations. It should be here obvious that the only delay factor of transistor 60 which has any affect upon the frequency of oscillation sensed by counter 82 is its turn-off delay. Equation 8 as derived above from the circuit of FIG. 1 is equally valid for the circuit of FIG. 3 with the exception that $\lambda = D + t_{off}$. Therefore, the frequency as monitored by counter 82 is directly dependent upon the turn-off delay of the unit under test.

An unobvious advantage of the circuit of FIG. 3 may be appreciated by first considering a normal test setup. When a transistor is driven from an exterior source of constant wave-form pulses, the transistor's output is solely a function of its transfer characteristic. Thus, any measurement made is on a pulse which has experienced only one excursion through the transistor. When a test result falls near the acceptability threshold, it is difficult to sort the acceptable from nonacceptable devices. In the case of the circuit of FIG. 3, however, the input waveform is a function of the transfer characteristic of the unit under test itself, and in the repetitive operation of the circuit, is multiplied by itself over and over again. Thus, if the turn-off delay of transistor 60 is too long, the succeeding input to the base circuit will be the inverted "too-long" negative-going waveform. This waveform will again be affected by the "too-long" turn-off waveform and the final turn-off waveform being even more accentuated in its turn-off time slowness. This situation continues until a balance is reached wherein the turn-off waveform is unable to deteriorate any further. It has been found that this accentuation works as a time scale amplification factor of approximately 10 thereby allowing even more accurate measurements to be made.

Turning now to the turn-on delay test, switch 86 is connected to contact 90 so that negative potential $-V_1$ is applied to base terminal 63. This potential renders transistor 60 normally nonconductive and causes capacitor 74 to acquire a negative charge. Assume now that positive-going potential 120 arrives at point 72 and passes through capacitor 74 to base terminal 63 of transistor 60. Transistor 60 responds to waveform 120 by becoming conductive and producing output waveform 122—offset in time from waveform 120 by the turn-on delay ($t_{on}$). Capacitor 74 having been charged by waveform 120 begins to discharge (waveform 124) immediately after waveform 120 has passed. When the charge on capacitor 74 decreases to the point where transistor 60 no longer remains in conduction, e.g., $V_{nc}$, the potential at collector 61 rises (waveform 125). At this time, negative-going shift 126 from the lagging edge of the preceding turn-off waveform also arrives, but has not effect on the conduction state of transistor 60. Subsequently, waveform 122′ (which is waveform 122 both delayed by a time D and inverted) arrives at base terminal 63 causing transistor 60 to again become conductive (waveform 128). The remaining action of the circuit is much the same as that described for the turn-off delay test and will not be further described.

While the invention has been particularly shown and described with reference to preferred embodiments thereof, it will be understood by those skilled in the art that the foregoing and other changes in form and details may be made therein without departing from the spirit and scope of the invention. For instance, if the delay time of the delay line is accurately known, a standard device need not be first inserted in the test circuit to set the desired limits since these can be mathematically determined.

We claim:

1. In a time delay tester for determining turn-off and turn-on delay of a unit under test which produces a signal phase inversion between its input and output, the combination comprising:

passive feedback means coupling the output of the unit under test to its input, said means delaying and inverting the output signal from said unit under test and to apply said delayed and inverted output signal to said input, means for biasing said unit under test to produce a stable first output, said delayed and inverted output signal temporarily causing said unit under test to produce an unstable second output, said bias means acting to restore said unit under test to its stable first output prior to the arrival from said feedback means of the delayed and inverted unstable second output at the input to said unit under test, said feedback means including a delay line in the form of a coaxial cable comprising an inner signal conductor and an outer conductive shield, said coaxial cable being wound around a core of magnetic material the output of said unit under test being connected at a first point to said signal conductor, said conductive shield being grounded at said first point, and the input of said unit under test being connected at a second point to said conductive shield, said signal conductor being grounded at said second point.

References Cited

UNITED STATES PATENTS 2,589,816  3/1952  Jarmotz _____ 331—135
2,894,206  7/1959  Montgomery _____ 324—158
3,039,057  6/1962  Connors _____ 324—158

OTHER REFERENCES

Army Technical Manuel 11–690: Basic Theory and Application of Transistors, March 1959, pp. 178–9.

G.E. Transistor Manual (6th Edition), March 1962, pp. 155–158.

RUDOLPH V. ROLINEC, *Primary Examiner.*

WALTER L. CARLSON, *Examiner.*

E. L. STOLARUN, *Assistant Examiner.*

PO-1050
(5/69)

UNITED STATES PATENT OFFICE
CERTIFICATE OF CORRECTION

Patent No. 3,389,336                 Dated June 18, 1968

Inventor(s) M. Hilsenrath et al

It is certified that error appears in the above-identified patent and that said Letters Patent are hereby corrected as shown below:

Column 4, line 10, that portion of the formula reading:

$f_1$         should read         $f_2$

Signed and sealed this 17th day of August 1971.

(SEAL)
Attest:

EDWARD M. FLETCHER, JR.          WILLIAM E. SCHUYLER, JR.
Attesting Officer                Commissioner of Patents